(12) United States Patent
Qian (10) Patent No.: US 7,194,110 B2
(45) Date of Patent: Mar. 20, 2007

(54) METHOD AND APPARATUS FOR TRACKING FEATURES IN A VIDEO SEQUENCE

(75) Inventor: Richard J. Qian, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 10/323,322

(22) Filed: Dec. 18, 2002

(65) Prior Publication Data

US 2004/0120548 A1    Jun. 24, 2004

(51) Int. Cl.
G06K 9/00      (2006.01)
G06K 9/46      (2006.01)
H04N 5/225     (2006.01)

(52) U.S. Cl. .................... 382/103; 382/190; 348/169

(58) Field of Classification Search ............... 382/103, 382/190; 348/169
See application file for complete search history.

(56) References Cited

U.S. PATENT DOCUMENTS

| | | | | |
|---|---|---|---|---|
| 4,959,714 A * | 9/1990 | Lo et al. ................... 348/172 |
| 5,280,530 A * | 1/1994 | Trew et al. ................ 382/103 |
| 5,727,093 A * | 3/1998 | Uchiyama et al. .......... 382/294 |
| 5,764,283 A * | 6/1998 | Pingali et al. .............. 348/169 |
| 5,995,639 A * | 11/1999 | Kado et al. ................. 382/118 |
| 6,031,568 A * | 2/2000 | Wakitani ..................... 348/169 |
| 6,188,776 B1 * | 2/2001 | Covell et al. ............... 382/100 |
| 6,272,231 B1 * | 8/2001 | Maurer et al. .............. 382/103 |
| 6,587,586 B1 * | 7/2003 | Cui et al. .................... 382/176 |
| 6,681,032 B2 * | 1/2004 | Bortolussi et al. .......... 382/118 |
| 6,714,661 B2 * | 3/2004 | Buddenmeier et al. ..... 382/103 |
| 6,766,035 B1 * | 7/2004 | Gutta .......................... 382/103 |
| 6,795,567 B1 * | 9/2004 | Cham et al. ................. 382/103 |
| 6,834,115 B2 * | 12/2004 | Maurer et al. .............. 382/103 |
| 6,873,713 B2 * | 3/2005 | Okazaki ..................... 382/118 |
| 6,901,110 B1 * | 5/2005 | Tsougarakis et al. .. 375/240.12 |
| 6,956,603 B2 * | 10/2005 | Fujii ........................... 348/169 |
| 7,006,950 B1 * | 2/2006 | Greiffenhagen et al. ....... 703/2 |
| 2002/0044691 A1 * | 4/2002 | Matsugu ..................... 382/218 |
| 2002/0122573 A1 * | 9/2002 | Eraslan ....................... 382/118 |
| 2003/0219147 A1 * | 11/2003 | Nishiura ..................... 382/103 |
| 2004/0213437 A1 * | 10/2004 | Howard et al. ............. 382/115 |
| 2005/0008246 A1 * | 1/2005 | Kinjo .......................... 382/254 |

* cited by examiner

Primary Examiner—Matthew C. Bella
Assistant Examiner—Utpal Shah
(74) Attorney, Agent, or Firm—L. Cho (57) ABSTRACT

A method for performing feature tracking includes generating a pool of candidates on an image frame for a first feature point from information about a pool of candidates for a second feature point on a previous image frame.

33 Claims, 8 Drawing Sheets

METHOD AND APPARATUS FOR TRACKING FEATURES IN A VIDEO SEQUENCE

FIELD

The present invention relates to visual feature tracking. More specifically, the present invention relates to a method and apparatus for tracking features in a video sequence.

BACKGROUND

Applications of feature tracking include the generation of high quality facial animation as well as the efficient compression of image data for video conferencing. In general, features are salient parts of an object. Features may be defined by and modeled as a group of spatially-connected feature points in three-dimensional (3D) space. Tracking features in 3D space may be achieved by tracking the images of their corresponding features points in a video sequence. Namely, the images are the two-dimensional (2D) projections of the 3D feature points onto the image plane of the video camera. As the position of the object changes in 3D, the positions of its features will change in the video sequence. One task of tracking is to determine a global 3D transform including rotation and translation for the feature points to account for the position changes at each image frame.

Traditional approaches for determining the global rotation and translation of an object from a video sequence, however often produced unstable tracking performance. When feature points were incorrectly identified over a series of image frames, the tracked targets would appear to drift away from their true locations over time. In some instances, the tracked targets would be lost completely. Various techniques such as linear and nonlinear Kalman filtering were implemented in order to improve tracking results. Kalman filtering used historical information associated with past movement of feature points to predict present rotational and translational movement of the feature points. However, in instances where feature points were incorrectly identified, Kalman filtering often accelerated the undesirable drifting result instead of correcting it.

Thus, what is needed is a method and apparatus for efficiently and effectively tracking feature points.

BRIEF DESCRIPTION OF THE DRAWINGS

The features and advantages of the present invention are illustrated by way of example and are not intended to limit the scope of the present invention to the particular embodiments shown, and in which.

DETAILED DESCRIPTION

In the following description, for purposes of explanation, specific nomenclature is set forth to provide a thorough understanding of the present invention. However, it will be apparent to one skilled in the art that these specific details may not be required to practice the present invention. In other instances, well-known circuits and devices are shown in block diagram form to avoid obscuring the present invention unnecessarily.

Figure 1:
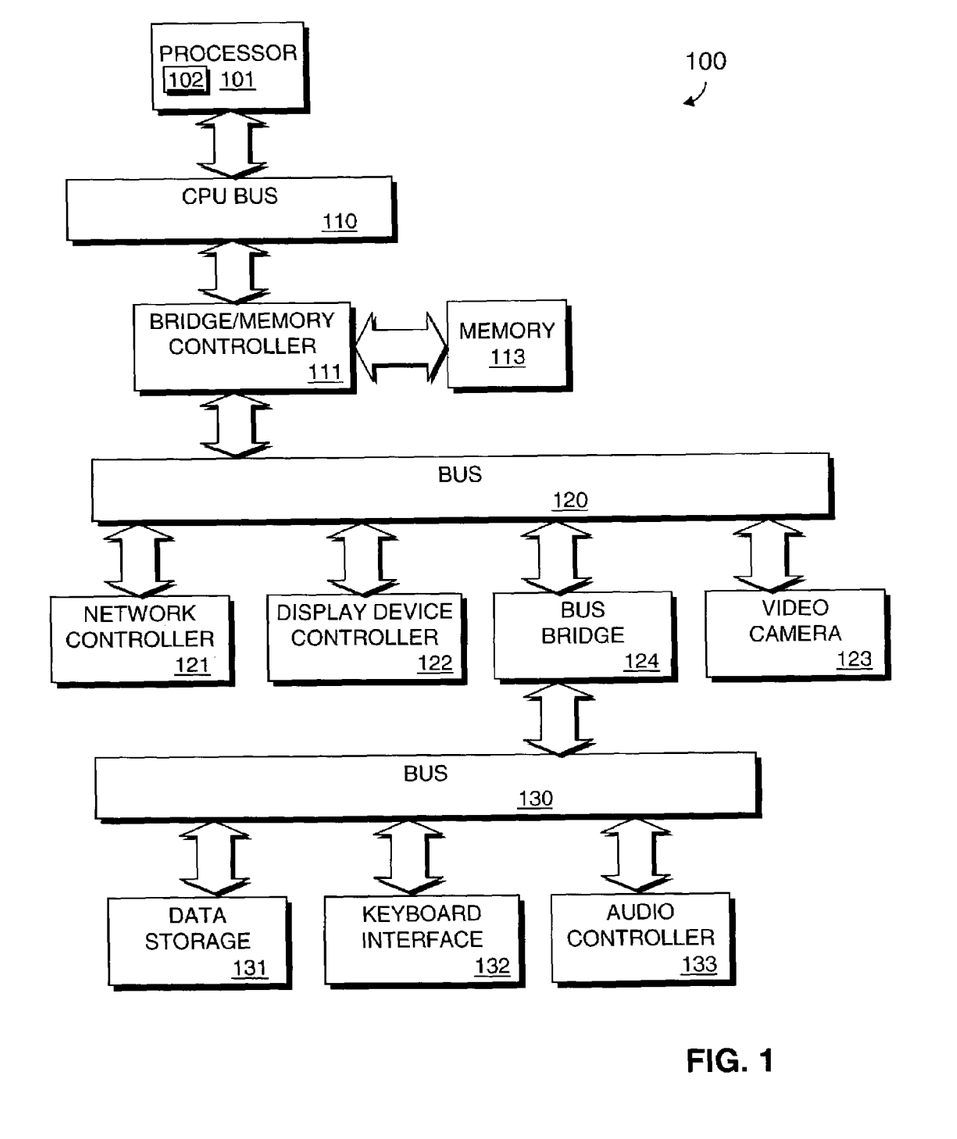
FIG. 1 is a block diagram of a computer system implementing an embodiment of the present invention.

FIG. 1 is a block diagram of a computer system 100 upon which an embodiment of the present invention can be implemented. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory device, a static random access memory device, or other memory device. The memory 113 may store instructions and code represented by data signals that may be executed by the processor 101. A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 may link the computer system 100 to a network of computers (not shown in FIG. 1) and supports communication among the machines. A display device controller 122 is coupled to the first I/O bus 120. The display device controller 122 allows coupling of a display device (not shown) to the computer system 100 and acts as an interface between the display device and the computer system 100. The display device may be a television set, a computer monitor, a flat panel display or other display device. The display device receives data signals from the processor 101 through the display device controller 122 and displays the information and data signals to the user of the computer system 100. A video camera 123 is coupled to the first I/O bus 120. The video camera 120 operates to capture an image of an object. The video camera 123 may be a digital video camera having internal digital video capture hardware that translates the captured image into digital graphical data. The video camera 123 may be an analog video camera having digital video capture hardware external to the video camera 123 for digitizing the captured image.

A second I/O bus 130 may be a single bus or a combination of multiple buses. As an example, the second I/O bus 130 may comprise a PCI bus, a PCMCIA bus, a NuBus, an Industry Standard Architecture bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130.

A bus bridge 124 couples the first I/O bus 120 to the second I/O bus 130. The bus bridge 124 operates to buffer and bridge data signals between the first I/O bus 120 and the second I/O bus 130.

The present invention is related to the use of the computer system 100 to track features in a video sequence as captured by the video camera 123. According to one embodiment, tracking features is performed by the computer system 100 in response to the processor 101 executing a sequence of instructions in main memory 113. Such instructions may be read into memory 113 from another computer-readable medium, such as data storage device 131, or from another source via the network controller 121. Execution of the sequence of instructions causes the processor 101 to track features in a video sequence, as will be described hereafter. In an alternative embodiment, hardware circuitry may be used in place of or in combination with software instructions to implement the present invention. Thus, the present invention is not limited to any specific combination of hardware circuitry and software.

Figure 2:
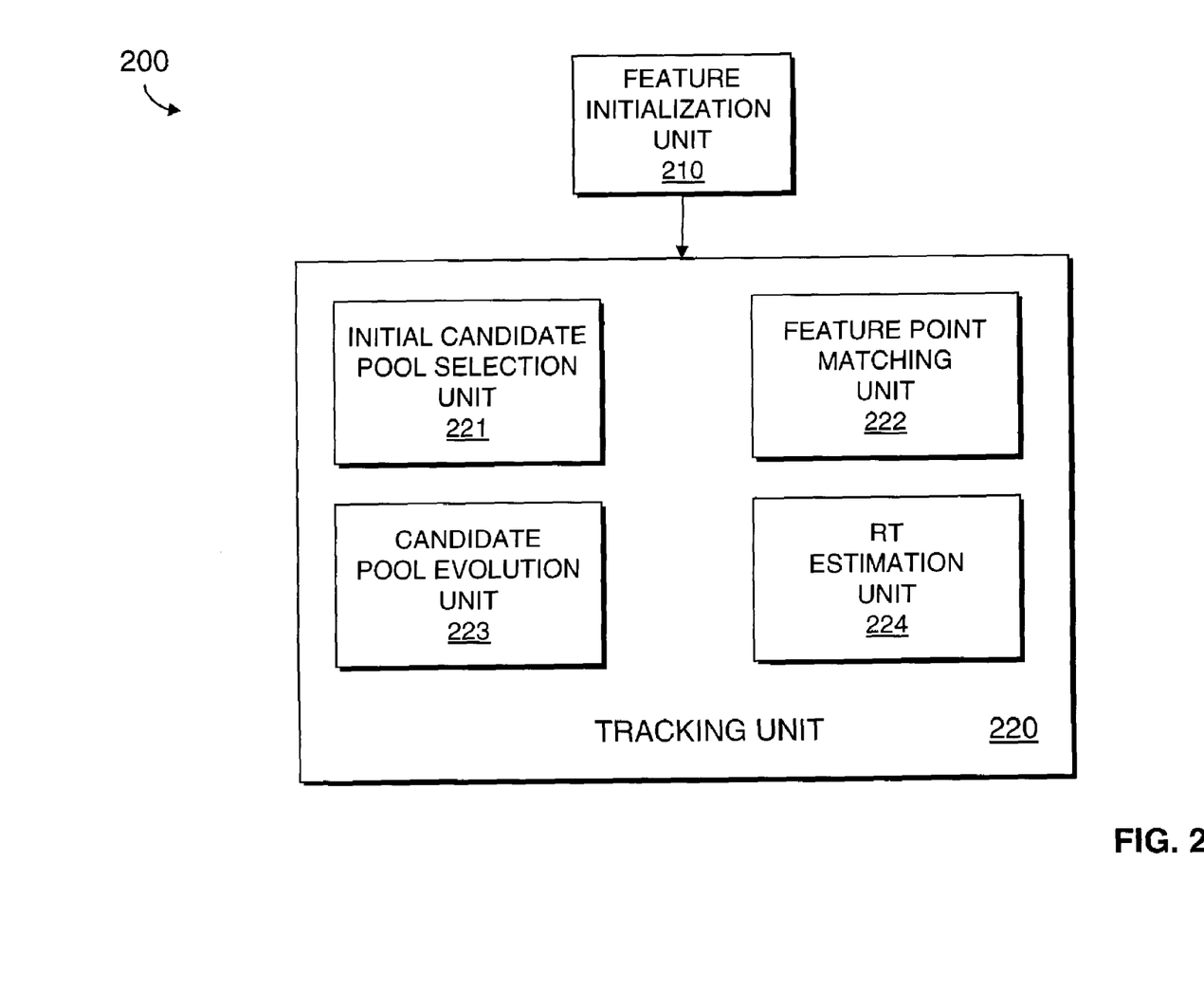
FIG. 2 is a block diagram of an image processing unit according to an embodiment of the present invention.

FIG. 2 is a block diagram of an image processing unit 200 according to an embodiment of the present invention. In an embodiment of the present invention, the image processing unit 200 is implemented in software and reside in main memory 113 (shown in FIG. 1) of the computer system 100 (shown in FIG. 1) as sequences of instructions. It should be appreciated that the modules may be implemented by hardware or a combination of both hardware and software. The image processing unit 200 includes a feature initialization unit 210. The feature initialization unit 210 receives image data. The image data may be, for example, a video stream that originates from the video camera 123 (shown in FIG. 1) or other imaging source. The feature initialization unit 210 assigns or initializes feature points to an object in a first frame of the image data. A feature point may be, for example, a single pixel or a plurality of pixels with a given coordinate(s). The feature points may be used to define the position of features in the object. The features in the object may be initialized by utilizing user input or responses. Alternatively, the features in the object may be initialized by performing feature point detection or other type of assignment technique. The feature points are spatially-connected points in a 3D space. For the purposes of performing feature tracking the distances between the feature points are considered fixed.

According to an embodiment of the present invention, the features of interest are represented by feature points as $x_i(t)=[x_i(t), y_i(t), z_i(t)]^T$ and their 2D images as $X_i(t)=[X_i(t), Y_i(t)]^T$, where $i=1, \ldots, L$ and $t$ denotes time or image frame number. Each feature may be represented by multiple feature points. When the features moves from frame to frame, all $x_i$ as a group undergo a global rotation and translation with some potential local deformations. Given the initial locations of the feature points, i.e., $x_i(0)$ for all i, the task of tracking can be considered as recovering the 3D rotation and translation matrices and the local deformations over time. The relationship between the 3D rotation and translation matrices and the feature points at time or image frame numbers t and t+1 can be shown with the following equation.

$$x_i(t+1)=R(t)x_i(t)+T(t) \qquad (1)$$

The relationship between feature points at time t+1 in 2D and feature points at time t+1 in 3D can be seen as shown with the following equation.

$$X_i(t+1) = [X_i(t+1), Y_i(t+1)]^T = \left[f\frac{x_i(t+1)}{z_i(t+1)}, f\frac{y_i(t+1)}{z_i(t+1)}\right]^T \qquad (2)$$

The image processing unit 200 includes a tracking unit 220. The tracking unit 220 receives the image data and operates to estimate a location of the feature points in subsequent image frames so that a change in rotational and translational position of the feature points may be determined in the subsequent image frames. The tracking unit 220 includes an initial candidate pool selection unit 221. The initial candidate pool selection unit 221 receives data regarding the feature points initialized by the feature initialization unit 210. The data may include the RGB values, intensity values, and/or other characteristics of the feature points. The initial candidate pool selection unit 221 generates a plurality or "pool" of candidates in a second image frame for each of the feature points initialized in the first image frame. One of the candidates from each of the pools will be selected as an observed feature point for the second image frame. The observed feature points in the second image frame is an estimation of where the feature points initialized in the first image frame would be subject to any rotational and/or translational movement between image frames.

According to an embodiment of the image processing unit 200, the initial candidate pool selection unit 221 generates candidates by comparing the characteristics of the feature points initialized in the first image frame with the characteristics of other points in the second image frame. Alternatively, the initial candidate pool selection unit 221 may generate candidates by using template matching or other image measuring algorithms. The candidate in each pool having characteristics that most closely resemble a corresponding feature point in the first image frame is the selected candidate for the second image frame. The selected candidate for the second image frame is designated as the observed feature point for the second image frame.

The tracking unit 220 includes a feature point matching unit 222. The feature point matching unit 222 generates a probability value for the candidates for a feature point in a current image frame. The probability value for a candidate represents the likelihood that the candidate is the feature point in the current frame. According to an embodiment of the present invention, probability values are generated by performing a comparison of the characteristics of a candidate with its corresponding feature point or observed feature point in the previous frame. Probability values for a candidate for a feature point may also be generated by performing spatial temporal averaging where the characteristics of a candidate is compared with averaged characteristics of the candidates for the feature point from the previous frame or by performing temporal averaging where the characteristics of a candidate is compared with an average of the characteristics of the feature point or observed feature point from previous frames. It should be appreciated that the feature point matching unit 222 may also generate probability values using other techniques.

The tracking unit 220 includes a candidate pool evolution unit 223. The candidate pool evolution unit 223 operates to generate a plurality or pool of candidates by cross sampling. According to an embodiment of the tracking unit 220, the candidate pool evolution unit 223 generates a pool of candidates for a first feature point on an image frame utilizing candidate information corresponding to a second feature point on a previous image frame. This may be achieved, for example, by selecting a candidate for the second feature point from its pool of candidates on the previous frame. According to an embodiment of the present invention, a candidate may be selected by weighting the candidates based on their probability values and randomly selecting one of the candidates from the pool. A candidate for the first feature point is generated by projecting the fixed distance between the first feature point and the second feature point from the position of the selected candidate from the second image frame, and searching a neighborhood of the projection for a pixel or a plurality of pixels that may be designated as a candidate. According to an embodiment of the present invention, the neighborhood may be a patch of any size and the searching may involve template matching. A probability value for the candidate may be generated by the feature pool matching unit 222. Additional candidates for the first feature points may be generated by cross sampling candidates for the second feature points at the previous image frame, projecting the fixed distances, and selecting candidates from neighborhoods of the projections. Alternatively, candidates for the first feature points may be generated by cross sampling a plurality of candidates for other feature points at the previous image frame. Candidates for other feature points on the second image frame may be generated in a similar manner.

According to an embodiment of the present invention, the candidate pool evolution unit 223 generates a series of K temporary candidates by cross sampling previously generated candidates. This may be achieved, for example, by performing sequential Monte Carlo sampling. The cross sampling performed by the candidate pool evolution unit 223 assumes that the candidate pools from the previous image frame represent equivalent distributions. In this embodiment, candidate generation is performed K times, where K is a number that allows the cross sampling to converge. After the Kth time temporary candidates and temporary probability values are generated for the feature points, the temporary candidates and temporary probability values are designated as being the candidates and probability values for the image frame. The feature point matching unit 222 selects a candidate from each candidate pool and designates the selection as the observed feature point for the image frame.

The tracking unit 220 includes a rotation and translation estimation unit 224 (shown as RT estimation unit 224). The rotation and translation estimation unit 224 computes an estimated rotational and translational change in position of the feature points between a frame and a previous frame. According to an embodiment of the present invention, the rotation and translation estimation unit 224 computes rotation and translation matrices by minimizing the function shown below.

$$(\tilde{R}(t), \tilde{T}(t)) = \underset{R,T}{\arg\min} \sum_i \|X_i(t+1) - \overline{X}_i(t+1)\|^2 \quad (3)$$

$(\tilde{R}(t),\tilde{T}(t))$ are the estimated global rotation and translation matrices from time t to t+1 and $\overline{X}_i(t+1)$ is an observed image sample of $x_i$ at time t+1. The observed image sample is the selected candidate or observed feature point for $x_i$ at time t+1.

It should be appreciated that feature initialization unit 210, initial candidate pool selection unit 221, feature point matching unit 222, candidate pool evolution unit 223, and rotation and translation estimation unit 224 may be implemented using any known circuitry or technique. According to an embodiment of the present invention, the feature initialization unit 210, initial candidate pool selection unit 221, feature point matching unit 222, candidate pool evolution unit 223, and rotation and translation estimation unit 224 are implemented in hardware and all reside on a single semiconductor substrate.

Figure 3:
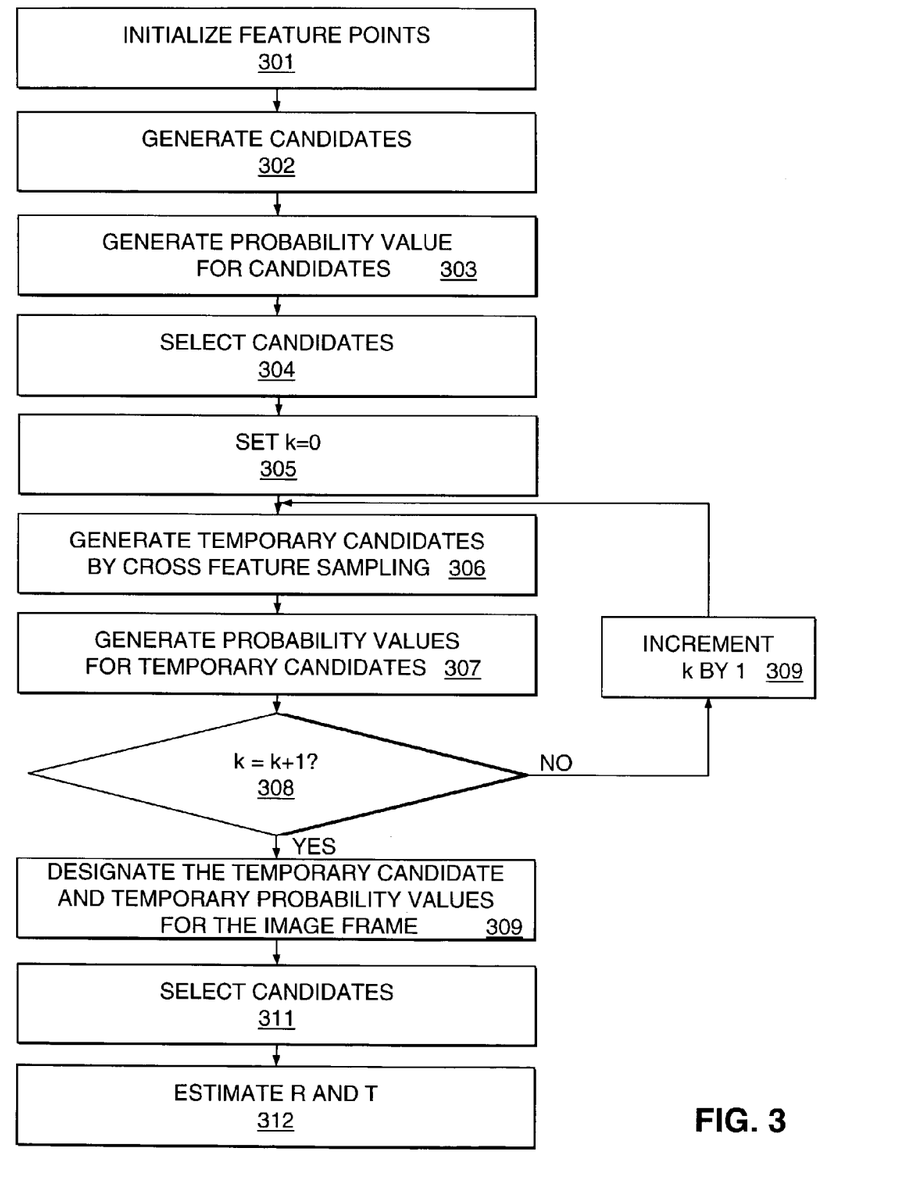
FIG. 3 is a flow chart illustrating a method for performing feature tracking according to an embodiment of the present invention.

FIG. 3 is flow chart illustrating a method for performing feature tracking according to an embodiment of the present invention. At 301, feature points are assigned or initialized at a first frame in a video sequence. The feature points may identify features of an object in the first image frame. The feature points may be initialized by utilizing user response, feature point detection, or other techniques.

At 302, candidates for the feature points are generated for a second image frame. The candidates for the second image frame represent possible changes in rotational and translational positions of the feature points in the first image frame. A plurality or pool of candidates may be generated for each feature point for the second image frame. The pool of candidates may be generated using feature point matching, template matching, or other image measuring algorithms.

At 303, probability values are generated for each of the candidates. Probability values represent the closeness in characteristics of a candidate with respect to its corresponding feature point. According to an embodiment of the present invention, probability values may be generated by comparing the characteristics of a candidate with the characteristics of its corresponding feature point in a previous image frame.

In other instances, when applicable, probability values may be generated by comparing the characteristics of a candidate with an average of the characteristics of candidates for a corresponding feature point in a previous image frame or an average of the characteristics of corresponding feature points in a series of previous image frames.

At 304, a candidate is selected from each pool of candidates. According to an embodiment of the present invention, a candidate may be selected by weighting candidates in a pool with respect to their probability values and selecting a candidate randomly. The candidate selected is designated as the observed feature point for the second image frame.

At 305, index k is set to 0.

At 306, temporary candidates are generated by cross feature sampling. According to an embodiment of the present invention temporary candidates are generated for each feature point by selecting candidates or temporary candidates that were previously generated and that correspond to other feature points. The fixed distance between a feature point and a feature point corresponding to the cross sampled candidate is projected from the position of the selected candidate to establish a position of a neighborhood. A candidate for the feature point is selected from the neighborhood. It should be appreciated that temporary candidates may be generated by cross feature sampling candidates associated with a single other feature point or alternatively by cross feature sampling candidates associated with a plurality of other feature points.

At 307, probability values for each of the temporary candidates are generated. Probability values represent the closeness in characteristics of a temporary candidate with respect to its corresponding feature point or observed feature point in a previous image frame. According to an embodiment of the present invention, probability values may be generated by comparing the characteristics of a temporary candidate with the characteristics of its corresponding feature point or observed feature point in a previous image frame. In other instances, when applicable, probability values may be generated by comparing the characteristics of a temporary candidate with an average of the characteristics of candidates for a corresponding feature point or observed feature point in a previous image frame or an average of the characteristics of corresponding feature points and/or observed feature points in a series of previous image frames.

At 308, it is determined whether index k equals K−1. If k equals K−1, control proceeds to step 310. If k does not equal to K−1, control proceeds to step 309.

At 309, k is incremented. Control proceeds to step 306.

At 310, the temporary candidates are temporary probability values are designated as being candidates and probability values for the image frame.

At 311, a candidate is selected from each pool of candidates. According to an embodiment of the present invention, a candidate may be selected by weighting candidates in a pool with respect to their probability values and selecting a candidate randomly. The candidate selected is designated as the observed feature point for the image frame.

At 312, rotational and translational changes in positions are estimated for the feature points in the image frame based on the observed feature point for the image frame and the feature point for the previous image frame.

FIG. 3 is a flow chart illustrating a method for tracking features. Some of the procedures illustrated in the figures may be performed sequentially, in parallel or in an order other than that which is described. It should be appreciated that not all of the procedures described are required to be performed, that additional procedures may be added, and that some of the illustrated procedures may be substituted with other procedures.

Figure 4:
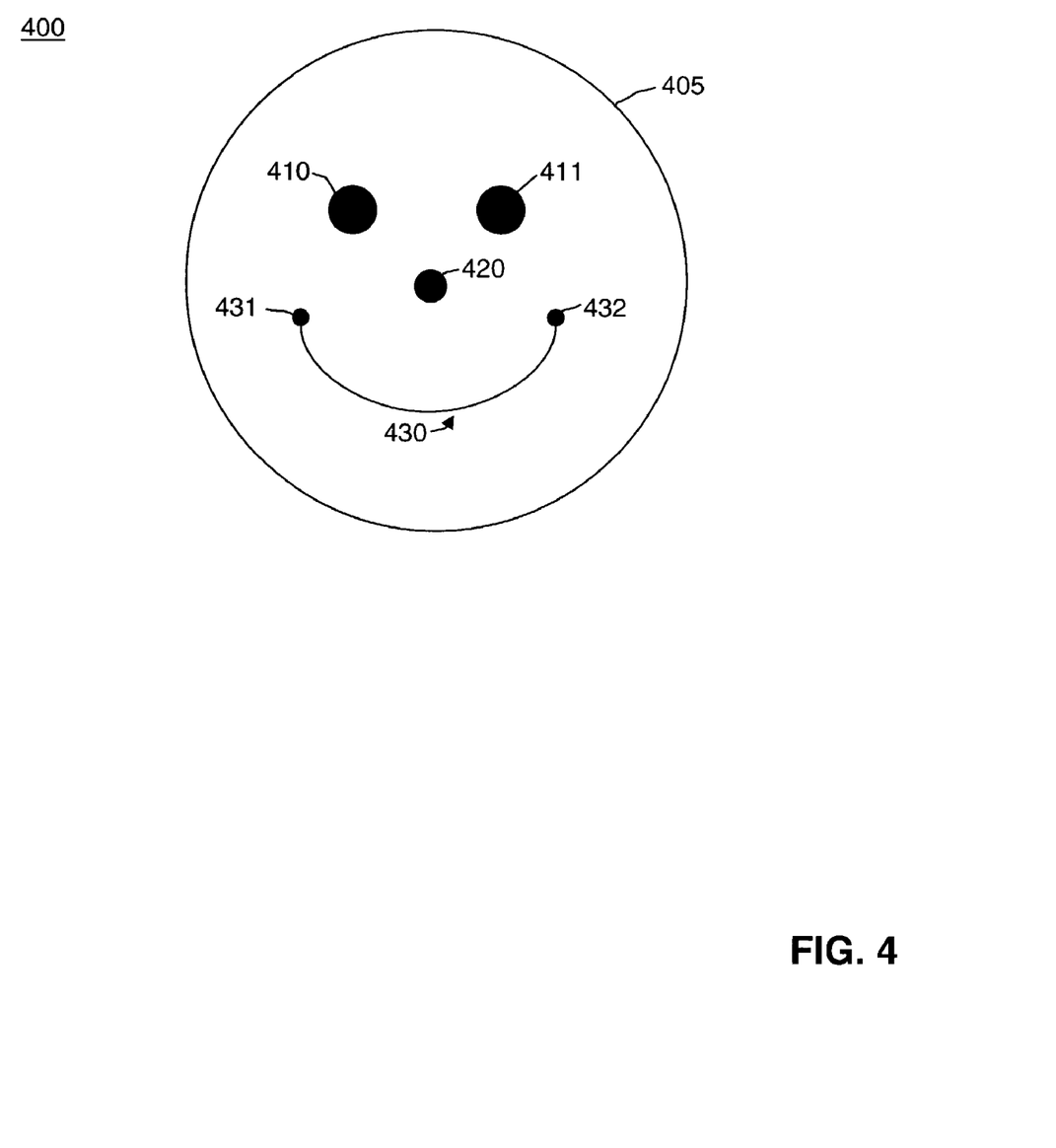
FIG. 4 illustrates an exemplary first image frame in a video sequence where initialization of feature points is performed according to an embodiment of the present invention.

FIGS. 4–7 illustrate an example of a method for tracking features in a video sequence according to an embodiment of the present invention. FIG. 4 illustrates an exemplary first image frame 400 of a video sequence. The first image frame 400 includes an image of a head 405. On the head 405 are eyes 410 and 411, a nose 420, and a mouth 430. For the purposes of this example, the corners of the mouth 430 will be the features that are tracked. A first feature point 431 will be assigned or initialized to a first corner of the mouth. A second feature point 432 will be assigned or initialized to a second corner of the mouth. The distance between the first and second feature points 431 and 432 is determined during initialization and is considered to be fixed for the purpose of feature tracking. It should be appreciated that other features of the mouth 430 and other features of objects such as the eyes 410 and 411 or nose 420 may also be initialized if they were to be tracked.

Figure 5A:
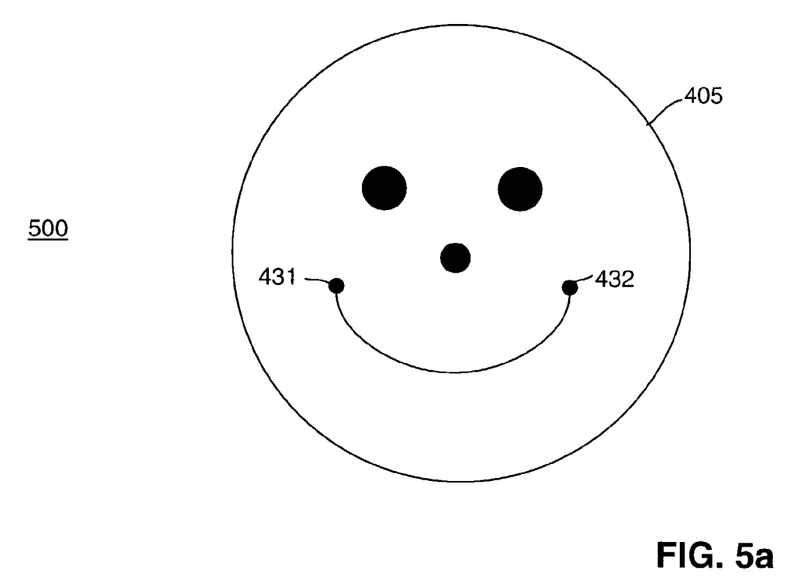
FIG. 5a illustrates an exemplary second frame image in the video sequence.
Figure 5B:
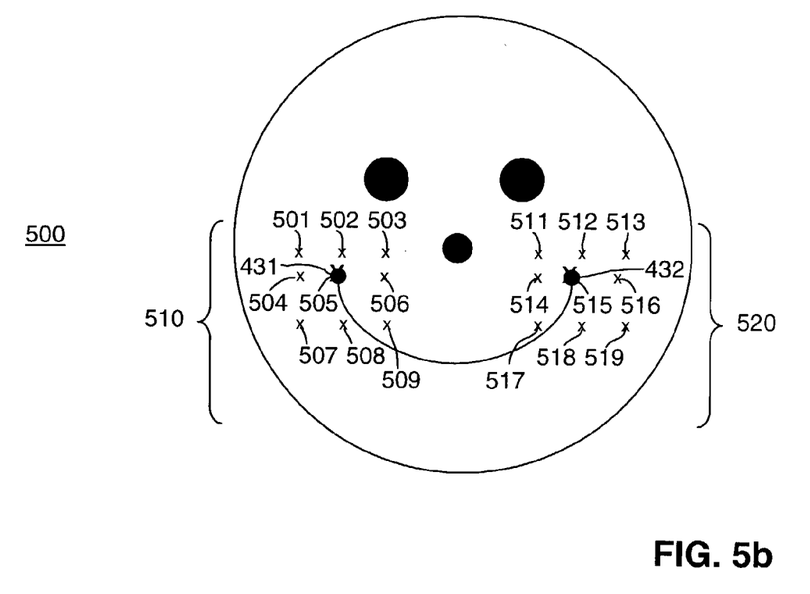
FIG. 5b illustrates an exemplary second image frame where selection of candidates is performed according to an embodiment of the present invention.

FIG. 5a illustrates an exemplary second image frame 500 of the video sequence. In the second image frame 500, the head 405 along with the corners of the mouth 430 have moved. In order to estimate the location of the first and second feature points 431 and 432, a pool of candidates for the first and second feature points 431 and 432 are generated. FIG. 5b illustrates the second image frame 500 of the video sequence with candidate selections made. Markings 501–509 represent a first pool of candidates 510 for the first feature point 431. Markings 511–519 represent a second pool of candidates 520 for the second feature point 432. The pool of candidates for each feature point may be generated by using feature point matching, template matching, or other image measuring algorithms.

Probability values are generated for each of the candidates. According to an embodiment of the present invention, probability values may be generated by comparing the characteristics of a candidate with the characteristics of its corresponding feature point in a previous image frame. Characteristics for candidates in pool 510 may be compared with characteristics of feature point 431. Characteristics for candidates in pool 520 may be compared with characteristics of feature point 432. A candidate is selected from each pool of candidates as being the observed feature point for the second image frame 500. According to an embodiment of the present invention, a candidate may be selected by weighting candidates in a pool with respect to their probability values and selecting a candidate randomly. In this example, candidate 505 is selected as being the observed first feature point and candidate 516 is selected as being the observed second feature point.

Figure 6A:
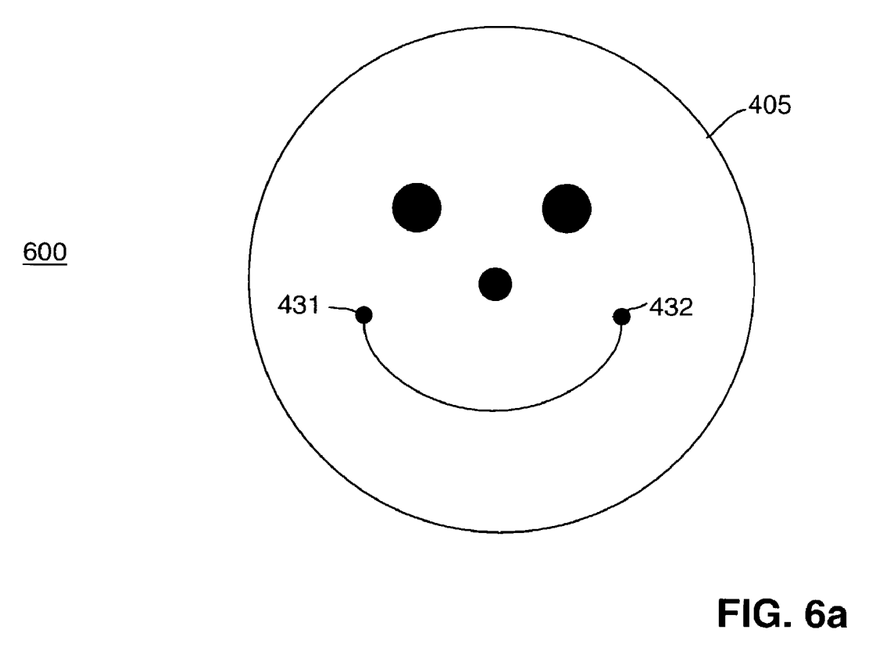
FIG. 6a illustrates an exemplary third image frame in the video sequence.

FIG. 6a illustrates an exemplary third image frame 600 according to an embodiment of the present invention. In the third image frame 600, there is no translational or rotational movement of the head or any of features on the head. In order to estimate the location of the first and second feature points 431 and 432, a pool of candidates for the first and second feature points 431 and 432 are generated. To generate a pool of candidates for the first and second feature points 431 and 432, temporary candidates are generated by cross feature sampling. According to an embodiment of the present invention temporary candidates are generated for the first feature point 431 by selecting candidates that were previously generated and that correspond to the second feature point 432. The fixed distance between the first feature point 431 and the second feature point 432 is projected from the position of the selected candidate to establish a position of the temporary candidate for the feature point.

Figure 6B:
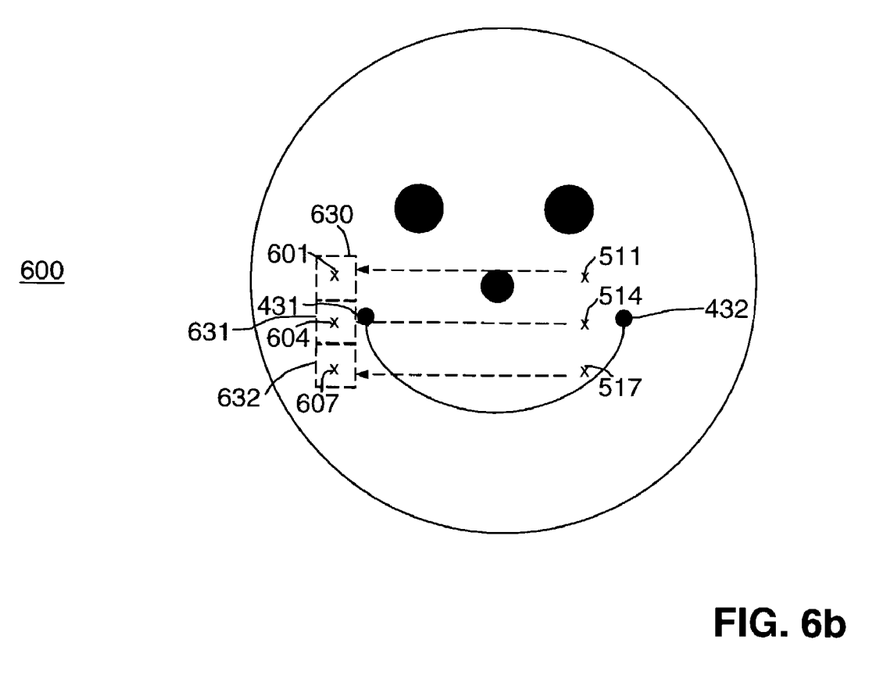
FIG. 6b illustrates an exemplary third image frame where an evolution of a first pool of candidates is taking place according to an embodiment of the present invention.

FIG. 6b illustrates the evolution of candidates from the first candidate pool 510 shown in FIG. 5b according to an embodiment of the present invention. Markings 511, 514, and 517 represent the position of three candidates for the second feature point 432 from the second image frame 500 (shown in FIG. 5) that are selected. The fixed distance between the first and second feature points 431 and 432 is projected from the position of the selected candidates 511, 514, and 517 to generate positions of neighborhoods 630–632 respectively. Three temporary candidates are selected from the neighborhoods 630–632 for the first feature point 431 on the third image frame. The three temporary candidates are shown as 601, 604, and 607.

Figure 6C:
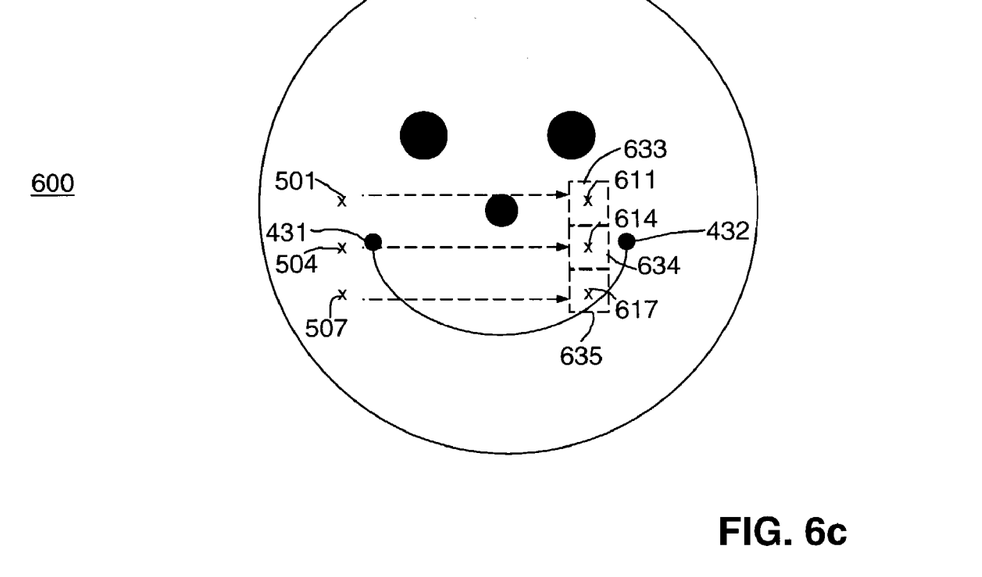
FIG. 6c illustrates an exemplary third image frame where an evolution of a second pool of candidates is taking place according to an embodiment of the present invention.

FIG. 6c illustrates the evolution of candidates from the second candidate pool 520 shown in FIG. 5b according to an embodiment of the present invention. Markings 501, 504, and 507 represent the position of three candidates for the first feature point 431 from the second image frame 500 (shown in FIG. 5) that are selected. The fixed distance between the first and second feature points 431 and 432 is projected from the position of the selected candidates 501, 504, and 507 to generate positions of neighborhoods 633–635 respectively. Three temporary candidates are selected from neighborhoods 633–635 for the second feature point 432 on the third image frame. The three temporary candidates are shown as 611, 614, and 617.

Figure 6D:
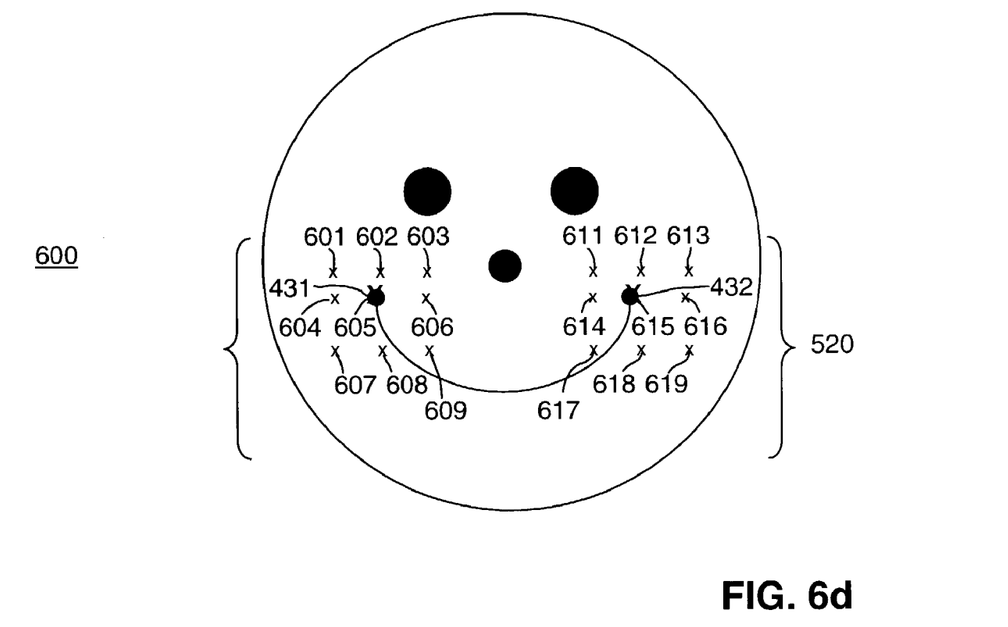
FIG. 6d illustrates an exemplary third image frame with generated temporary candidates.

FIG. 6d illustrates the temporary candidates generated for the first and second feature points 431 and 432 for the third image frame. Temporary candidates 601–609 are generated for the first feature point 431. Temporary candidates 611–619 are generated for the second feature point 432. The temporary candidates for a feature point were shown to be generated by performing cross feature sampling of candidates associated with a single other feature point. It should be appreciated that temporary candidates may also be generated by performing cross feature sampling of candidates associated with a plurality of other feature points. Probability values for each of the temporary candidates are generated. The probability values may be generated by comparing the characteristics of the candidates with their corresponding observed feature points 505 and 516.

Figure 7:
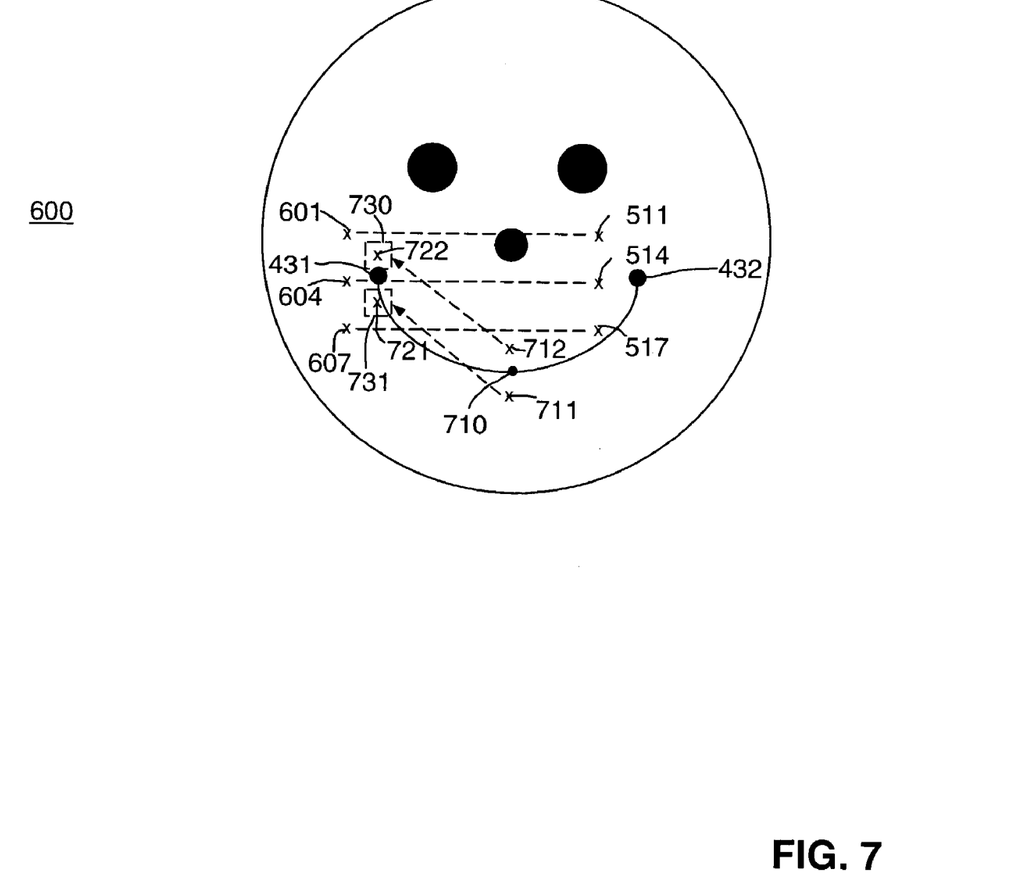
FIG. 7 illustrates the evolution of the candidate pools according to an alternate embodiment of the present invention.

FIG. 7 illustrates an example where temporary candidates for the first feature point 431 is generated by performing cross feature sampling of candidates associated with a plurality of other feature points. As similarly shown in FIG. 6b, candidates 601, 604, and 607 are generated from candidates associated with the second feature point 432 in the second image frame 500. In this example, an additional third feature point 710 is assumed to be used to define the bottom of the mouth 430. Assuming that the third feature point 710 has a pool of candidates from a previous image frame, those candidates may also be selected to generate candidates for feature point 431 in the present image frame. For example, markings 711 and 712 may represent the position of candidates for the third feature point 710 from a previous image frame that are selected. The fixed distance between the first and third feature points 431 and 710 is projected from the position of the selected candidates 711 and 712 to generate positions of neighborhoods 730 and 731. Two temporary candidates are selected from the neighborhoods 730 and 731 for the first feature point 431 on the third image frame. The additional temporary candidates are shown as 721 and 722.

The temporary candidates generated for the feature points for the second image frame may be used to generate a subsequent set of temporary candidates. According to an embodiment of the present invention, a series of K subsequent sets of temporary candidates are generated, where the Kth set of temporary candidates are designated for use as actual candidates for the purpose of feature point estimation. Although FIGS. 4–7 illustrate an example of feature tracking from a first through third image frame in a video sequence, it should be appreciated that the techniques described may be used to perform feature tracking on subsequent image frames. It should also be appreciated that the first, second, and third image frames 400, 500, and 600 described in FIGS. 4–7 may or may not be consecutive image frames in a video sequence. Other intermediate image frames may reside between the first, second, and third image frames 400, 500, and 600.

The techniques of the present invention maintains multiple candidates for a single feature point and evolves the candidates over time. In the event that spurious detection results in an incorrect selection of a candidate, the correct candidate may still be recovered if the correct candidate is carried forward and the spurious detection is corrected. The preservation and evolution of a pool of candidates is beneficial for robust tracking performance. The techniques of the present invention is an improvement over prior techniques which maintains a single estimation or a single candidate at a time.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for performing feature tracking on image frames, comprising:
   initializing first and second feature points on a first image frame;
   generating candidates for the first and second feature points on a second image frame; and
   generating candidates for the first feature point on a third image frame from information about candidates for the second feature point on the second image frame, wherein the first, second, and third image frames generate a video sequence.

2. The method of claim 1, wherein initializing the feature points on the first image frame comprises utilizing user responses.

3. The method of claim 1, wherein initializing the feature points on the first image frame comprises performing feature point detection.

4. The method of claim 1, wherein generating the candidates comprises performing template matching.

5. The method of claim 1, wherein generating the candidates comprises performing feature point matching.

6. The method of claim 1, wherein generating candidates for the first feature point on the third image frame from the information about the candidates for the second feature point on the second image frame comprises:
   selecting one of the candidates for the second feature point on the second image frame;
   projecting a fixed distance between the first and second feature points from a position of the candidate selected; and
   selecting a candidate in a neighborhood of the fixed distance.

7. The method of claim 1, further comprising generating candidates for the first feature point on the third image frame from information about the candidates for a third feature point on the second image frame.

8. The method of claim 1, wherein generating candidates for the first feature point on the third image frame comprises generating a series of temporary candidates based on information about previously generated candidates.

9. The method of claim 1, further comprising generating probability values for each of the candidates for the first feature point on the third image frame.

10. The method of claim 9, wherein generating probability values for each of the candidates for the first feature point on the third image frame comprises comparing each of the candidates with a selected candidate for the first feature point on the second image frame.

11. The method of claim 9, wherein generating probability values for each of the candidates for the first feature point on the third image frame comprises comparing each of the candidates with an average of the candidates for the first feature point on the second image frame.

12. The method of claim 9, wherein generating probability values for each of the candidates for the first feature point on the third image frame comprises comparing each of the candidates with an average of selected candidate for the first feature point for previous image frames.

13. The method of claim 1, further comprising selecting a candidate for each of the feature points on the second image frame.

14. The method of claim 1, further comprising selecting a candidate for the first feature point on the third image frame.

15. A machine-readable medium having stored thereon sequences of instructions, the sequences of instructions including instructions which, when executed by a processor, causes the processor to perform:
   initializing first and second feature points on a first image frame;
   generating candidates for the first and second feature points on a second image frame; and
   generating candidates for the first feature point on a third image frame from information about candidates for the second feature point on the second image frame, wherein the first, second, and third image frames generate a video sequence.

16. The machine-readable medium of claim 15, wherein generating candidates for the first feature point on the third image frame from the information about the candidate for the second feature point on the second image frame comprises:
   selecting one of the candidates for the second feature point on the second image frame;
   projecting a fixed distance between the first and second feature points from a position of the candidate selected; and
   selecting a candidate in a neighborhood of the fixed distance.

17. The machine-readable medium of claim 15, further comprising instructions which, when executed by the processor, causes the processor to perform generating candidates for the first feature point on the third image from information about the candidate for a third feature point on the second image frame.

18. The machine-readable medium of claim 15, wherein generating candidates for the first feature point on the third image frame comprises generating a series of temporary candidates based on information about previously generated candidates.

19. The machine-readable medium of claim 15, further comprising instructions which, when executed by the processor, causes the processor to perform generating probability values for each of the candidates for the first feature point on the third image frame.

20. An image processing unit, comprising:
   a feature initialization unit to initialize first and second feature points on a first image frame;
   a tracking unit to generate candidates for the first and second feature points on a second image frame and to generate candidates for the first feature point on a third image frame from information about candidates for the second feature point on the second image frame, wherein the first, second, and third image frames generate a video sequence.

21. The apparatus of claim 20, wherein the feature utilization unit initializes the feature points on the first image frame by utilizing user responses.

22. The apparatus of claim 20, wherein the feature utilization unit initializes the feature points on the first image frame by performing feature point detection.

23. The apparatus of claim 20, wherein the tracking unit comprises an initial candidate pool selection unit to generate the candidates by performing template matching.

24. The apparatus of claim 20, wherein the tracking unit comprises a feature point matching unit to generate the candidates by performing feature point matching.

25. The apparatus of claim 20, wherein the tracking unit comprises:
   a candidate pool evolution unit to select one of the candidates for the second feature point on the second image frame and to project a fixed distance between the first and second feature points from a position of the candidate selected; and
   a feature point matching unit to select a candidate in a neighborhood of the fixed distance.

26. The apparatus of claim 20, wherein the tracking unit comprises a candidate pool evolution unit to generate candidates for the first feature point on the third image frame from information about the candidates for a third feature point on the second image frame.

27. The apparatus of claim 20, wherein the tracking unit comprises a candidate pool evolution unit to generate candidates for the first feature point on the third image frame by generating a series of temporary candidates based on information about previously generated candidates.

28. The apparatus of claim 20, wherein the tracking unit comprises a feature point matching unit to generate probability values for each of the candidates for the first feature point on the third image frame.

29. The apparatus of claim 28, wherein generating probability values for each of the candidates for the first feature point on the third image frame comprises comparing each of the candidates with a selected candidate for the first feature point on the second image frame.

30. The apparatus of claim 28, wherein generating probability values for each of the candidates for the first feature point on the third image frame comprises comparing each of the candidates with an average of the candidates for the first feature point on the second image frame.

31. The apparatus of claim 28, wherein generating probability values for each of the candidates for the first feature point on the third image frame comprises comparing each of the candidates with an average of selected candidate for the first feature point for previous image frames.

32. The apparatus of claim 20, wherein the tracking unit comprises a feature point matching unit to select a candidate for each of the feature points on the second image frame.

33. The apparatus of claim 20, wherein the tracking unit comprises a feature point matching unit to select a candidate for the first feature point on the third image frame.

* * * * *